(12) United States Patent
You et al.

(10) Patent No.: US 8,571,760 B2
(45) Date of Patent: Oct. 29, 2013

(54) APPARATUS AND METHOD FOR TESTING AIR BAG CONTROL UNIT OF VEHICLE

(75) Inventors: Chang Beom You, Seoul (KR); Sang Uk Chu, Gyeonggi-do (KR); Jung-Pil Nam, Gyeonggi-do (KR); Dong-Hyun Kim, Gyeonggi-do (KR)

(73) Assignees: Hyundai Motor Company, Seoul (KR); Kia Motors Corporation, Seoul (KR); Continental Automotive Systems Corporation, Icheon, Gyeonggi-Do (KR)

( * ) Notice: Subject to any disclaimer, the term of this patent is extended or adjusted under 35 U.S.C. 154(b) by 512 days.

(21) Appl. No.: 12/956,471

(22) Filed: Nov. 30, 2010

(65) Prior Publication Data

US 2012/0078464 A1    Mar. 29, 2012

(30) Foreign Application Priority Data

Sep. 28, 2010    (KR) ........................ 10-2010-0093747

(51) Int. Cl.
*G01M 17/00*    (2006.01)

(52) U.S. Cl.
USPC ................................ 701/45; 701/46; 701/47

(58) Field of Classification Search
USPC .................................................... 701/45–47
See application file for complete search history.

(56) References Cited

U.S. PATENT DOCUMENTS

| | | | | |
|---|---|---|---|---|
| 5,608,629 A * | 3/1997 | Cuddihy et al. | .................. | 701/1 |
| 5,786,526 A * | 7/1998 | Byon | .......................... | 73/12.01 |
| 6,097,332 A * | 8/2000 | Crosby, II | ...................... | 342/72 |
| 6,675,320 B1 * | 1/2004 | Schumacher et al. | .......... | 714/12 |
| 7,804,843 B2 * | 9/2010 | Mayumi | ....................... | 370/449 |
| 2003/0209893 A1 * | 11/2003 | Breed et al. | ................... | 280/735 |
| 2005/0017488 A1 * | 1/2005 | Breed et al. | ................... | 280/735 |
| 2005/0278098 A1 * | 12/2005 | Breed | ............................ | 701/45 |
| 2006/0052924 A1 * | 3/2006 | Prakah-Asante et al. | ....... | 701/45 |
| 2006/0149449 A1 * | 7/2006 | Baur et al. | ..................... | 701/45 |
| 2006/0233292 A1 * | 10/2006 | Miura | ........................... | 375/362 |

FOREIGN PATENT DOCUMENTS

| | | |
|---|---|---|
| JP | 10194075 A | 7/1998 |
| JP | 10315907 A | 12/1998 |
| JP | 11278209 A | 10/1999 |
| KR | 10-0150043 | 6/1998 |
| KR | 10-0194360 | 2/1999 |
| KR | 10-1999-0027677 | 4/1999 |
| KR | 10-2001-0086494 | 9/2001 |

* cited by examiner

*Primary Examiner* — Calvin Cheung
(74) *Attorney, Agent, or Firm* — Edwards Wildman Palmer LLP; Peter F. Corless

(57) ABSTRACT

A system testing the air bag control unit of a vehicle testing an air bag control unit of a vehicle summing a first signal shaken by a shaker and a second signal provided from the signal control apparatus to generate a sum-sensing signal, and generating a determining signal for evaluation regarding presence of an operation of an air bag based on the sum-sensing signal, is provided. The system testing an air bag control unit of a vehicle, includes: a shaker control unit generating a first signal and start-synchronizing information regarding the first signal; a shaker shaking an air bag control unit according to a frequency of the first signal; a signal control unit time-synchronizing and transferring the second signal with the first signal using the start-synchronizing information to the air bag control unit; and an air bag control unit generating a sum-sensing signal regarding the first signal and the second signal, generating and transferring a determining signal for evaluation regarding presence of an operation of an air bag based on the sum-sensing signal to the signal control unit.

17 Claims, 6 Drawing Sheets

APPARATUS AND METHOD FOR TESTING AIR BAG CONTROL UNIT OF VEHICLE

CROSS-REFERENCES TO RELATED APPLICATIONS

This application claims under 35 U.S.C. §119(a) the benefit of Korean patent application number 10-2010-0093747, filed on Sep. 28, 2010, which is incorporated by reference in its entirety.

BACKGROUND OF THE INVENTION

1. Field of the Invention

The present invention relates to an apparatus and a method for testing air bag control unit of a vehicle.

2. Description of the Related Art

Most vehicles are provided with an air bag and a control unit thereof. The air bag control unit includes an impact deformation sensor and a microcomputer (not shown). The impact deformation sensor is provided at the front, rear, left, and right sides of a vehicle, and senses a frequency signal, namely, a frequency signal of a maximum 20 kHz generated when a vehicle collides or a vehicle body is deformed. The microcomputer receives a sensing signal from the impact deformation sensor to analyze a frequency signal, identifies presence of vehicle accident, and determines whether the air bag operates or does not. A sensing performance of a frequency signal of the impact deformation sensor is very important in the air bag system. Accordingly, a sensing performance according to frequency variation is experimented and evaluated, and evaluated contents are reflected in manufacturing a good quality impact deformation sensor.

To experiment and evaluate the performance of the impact deformation sensor, the related art generates a frequency less than about 1 kHz similar to a frequency signal generated when a vehicle collides or a vehicle body is deformed using a shaker to sample an impact state of a vehicle.

Accordingly, the impact deformation sensor senses an optionally generated frequency to generate an output signal, outputs a determining signal determining presence of an operation of an air bag using the output signal, and evaluates the determining signal output from an testing unit.

FIG. 1a shows a block diagram illustrating a vehicle deformation sensing principle of an impact deformation sensor and FIG. 1b illustrates an example of the configuration of a conventional tester for testing the impact deformation sensor.

A test product 3 such as an impact deformation sensor is mounted and fixed on a test plate 4. A shaker 1 and the test plate 4 are connected by a reciprocating rod 2. The shaker 1 reciprocates the test plate 3, causing an output signal of the impact deformation sensor to be generated. The generated output signal is tested.

The conventional tester has disadvantages. As described above, a frequency signal generated in the event of vehicle collision or deformation has a bandwidth of a maximum 20 kHz. However, a frequency sampled in the tester has a band less than 1 kHz. Namely, an impact state with respect to a frequency band ranging from 1 kHz to 20 kHz cannot be sampled.

The above information disclosed in this Background section is only for enhancement of understanding of the background of the invention and therefore it may contain information that does not form the prior art that is already known in this country to a person of ordinary skill in the art.

SUMMARY OF THE INVENTION

In an aspect, the present invention provides a system for testing an air bag control unit of a vehicle. The system comprises: a shaker control unit generating a first signal and start-synchronizing information corresponding to the first signal; a shaker shaking an air bag control unit according to the frequency of the first signal; a signal control unit time-synchronizing a second signal with the first signal using the start-synchronizing information and transferring the second signal to the air bag control unit; and an air bag control unit generating a sum-sensing signal from the first signal and the second signal, generating from the sum-sensing signal a determining signal of whether an air bag operates and transferring the generated determining signal to the signal control unit.

In another aspect, the present invention provides a signal control apparatus testing an air bag control unit of a vehicle. The apparatus comprises: a shaker control unit sensing a first signal that is used to operate a shaker; a communication module receiving from the shaker control unit start-synchronizing information regarding the first signal; a synchronizing module time-synchronizing a second signal with the first signal using the start-synchronizing information; and a control module transferring the second signal to the air bag control unit such that the air bag control unit outputs a determining signal of whether an air bag operates through a sum-sensing signal obtained from the first signal and the second signal.

In still another aspect, the present invention provides an air bag control unit for a vehicle. The control unit comprises: a sensor module sensing a shaking signal corresponding to a frequency of a first signal generated by a shaker; and a microcomputer receiving a second signal time-synchronized with the first signal, generating a sum-sensing signal using the first signal and the second signal, comparing the sum-sensing signal with a pre-set air bag operation reference value, and outputting a determining signal of whether an air bag operates.

In still yet another aspect, the present invention provides a method for testing an air bag control unit of a vehicle. The method comprises: (a) generating a first signal and start-synchronizing information corresponding to the first signal by a shaker control unit; (b) shaking an air bag control unit according to a frequency of the first signal by a shaker; (c) time-synchronizing a second signal with the first signal using the start-synchronizing information and transferring the second signal to the air bag control unit by a signal control unit; and (d) generating a sum-sensing signal from the first signal and the second signal, generating from the sum-sensing signal a determining signal of whether an air bag operates, and transferring the determining signal to the signal control unit by the air bag control unit.

In still further another aspect, the present invention provides a method for generating signal for testing an air bag control unit of a vehicle, the method comprising: (a) generating a first signal and start-synchronizing information corresponding to the first signal by a shaker control unit; (b) time-synchronizing the second signal with the first signal using the start-synchronizing information; and (c) transferring the second signal to an air bag control unit that the air bag control unit outputs a determining signal of whether an air bag operates from a sum-sensing signal obtained from the first signal and the second signal.

In a further aspect, the present invention provides a method for processing a signal for testing an air bag control unit of a vehicle. The method comprises: (a) sensing a shaking signal corresponding to a frequency of a first signal generated by a shaker; (b) receiving a second signal time-synchronized with the first signal; (c) generating a sum-sensing signal from the first signal and the second signal; and (d) comparing the sum-sensing signal with a pre-set air bag operation reference value, and outputting a determining signal of whether an air bag operates.

With the present invention, it is possible to test an air bag control unit conveniently and with high precision.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1A:
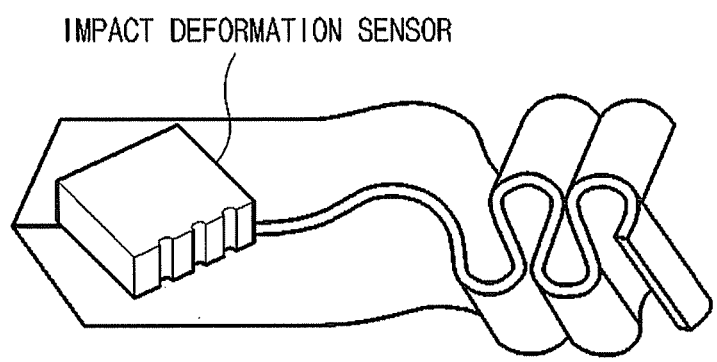
FIG. 1a is a block diagram illustrating a vehicle deformation sensing principle of an impact deformation sensor
Figure 1B:
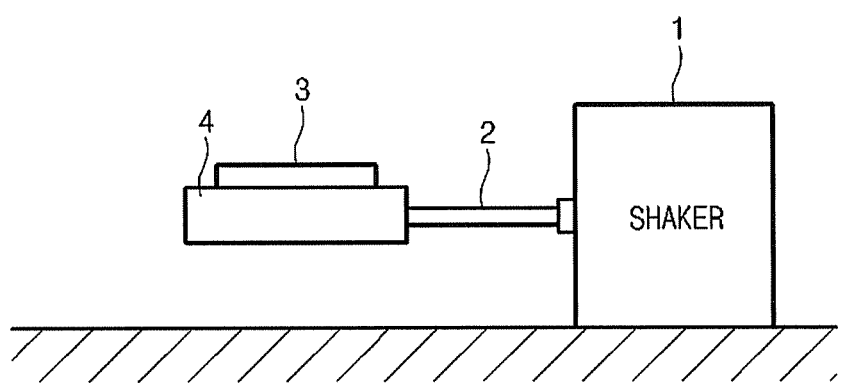
FIG. 1b is a side view illustrating an example of the configuration of a conventional tester for testing the impact deformation sensor.
Figure 2:
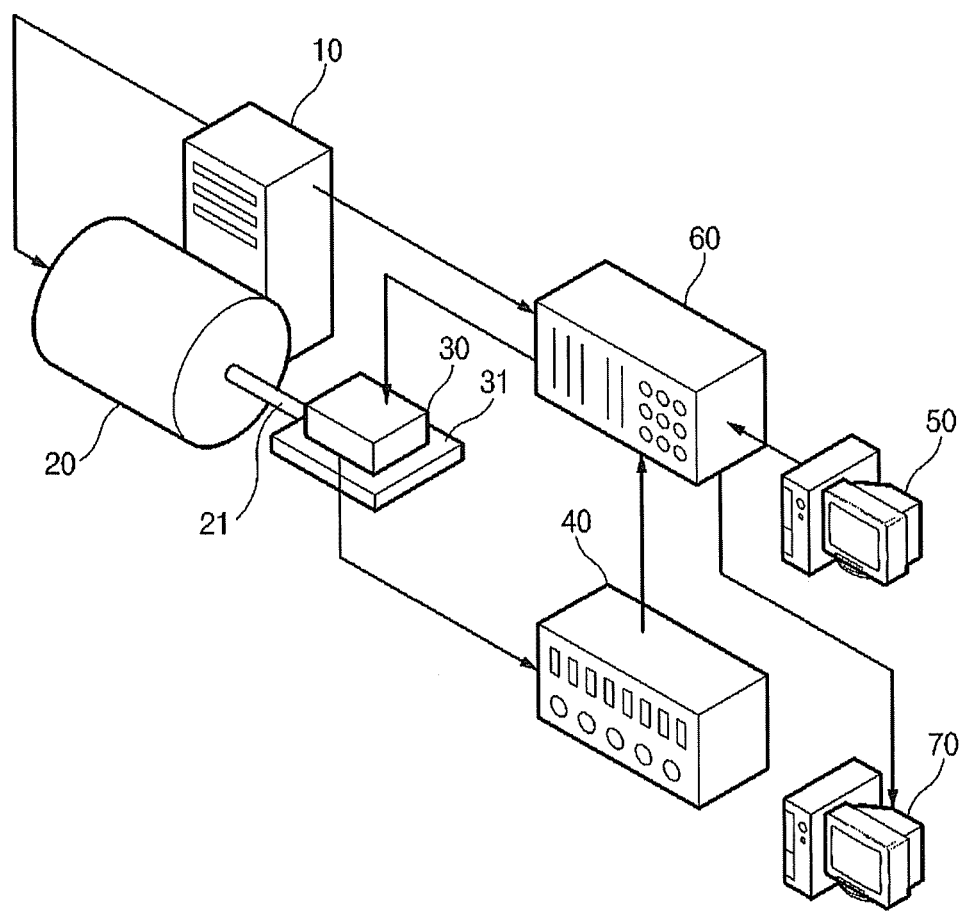
FIG. 2 is a view illustrating a system for testing an air bag control unit of a vehicle according to an embodiment of the present invention.

FIG. 2 is a view illustrating a system for testing an air bag control unit of a vehicle according to an embodiment of the present invention.

The system 100 for testing an air bag control unit for a vehicle according to an embodiment of the present invention includes a shaker control unit 10, a shaker 20, an air bag control unit 30, a load box 40, a signal generation unit 50, a signal control unit 60, and an testing unit 70.

The shaker control unit 10 generates a first signal of a frequency band of 1 kHz or lower, which samples an impact state of a vehicle, and transfer it to the shaker 20, and generates start-synchronizing information for the first signal and transfers it to the signal control unit 60.

The shaker 20 shakes the air bag control unit 30 according to a frequency of the first signal provided from the shaker control unit 10.

The air bag control unit 30 senses the first signal shaken by the shaker 20 and receives a second signal (crash sound sensing pulse) of a high frequency band from the signal control unit 60 to be described below. Further, the air bag control unit 30 generates a sum-sensing signal with respect to the first signal and the second signal. The air bag control unit 30 generates, by using the generated sum-sensing signal, an analog signal that determines whether an air bag operates, and transfers the generated analog determining signal to a load box 40.

The load box 40 converts the analog determining signal into a digital signal that determines whether an air bag operates, and transfers the digital determining signal to the signal control unit 60.

The signal generation unit 50 generates a second signal of a frequency band of greater than 1 kHz and not greater than 20 kHz, which samples an impact state of a vehicle, and transfers the second signal to the signal control unit 60.

The signal control unit 60 receives the start-synchronizing information for the first signal from the shaker control unit 10 and the second signal from the signal generation unit 50. Further, by using the start-synchronizing information, the signal control unit 60 time synchronizes the second signal with the first signal, and injects the resulting second synchronized signal to the shaker 20. Meanwhile, the signal control unit 60 transfers the digital determining signal from the load box 40 to the testing unit 70.

The testing unit 70 acquires the first signal, the second synchronized signal, and the digital determining signal in conjunction with the shaker control unit 10 and the signal control unit 60. Moreover, the testing unit 70 tests operation characteristics of the air bag control unit 30 using operation characteristics of the first signal, the second synchronized signal, and the digital determining signal, such as generation times of the determining signals by the first and second signals, and presence of generation of the determining signals according to frequency characteristics, etc.

Hereinafter, the system 10 for testing an air bag control unit of a vehicle according to the present invention will be explained in more detail.

Shaker Control Unit 10

The shaker control unit 10 generates a first signal of a frequency band of 1 kHz or lower, which samples an impact state of a vehicle, and generates start-synchronizing information for the first signal. Here, the start-synchronizing information (time synchronizing information) contains start time information of the first signal. Namely, the start-synchronizing information expresses relative start time information in which a frequency for an impact state starts in the first signal as wave variation (e.g., variation time of the rectangular wave from 0 to 1). For example, when a frequency starts to be generated at a time point of 40 ms in the first signal, the time point of the 40 ms is expressed as a start time. Accordingly, acquisition of the start-synchronizing information allows the relative start time information in which the first signal starts to be identified. The shaker control unit 10 is operatively associated with the testing unit 70 that allows the testing unit 70 to acquire the first signal.

Shaker 20

The shaker 20 is connected to a test plate 31 through a reciprocating rod 21. The air bag control unit 30 is fixed and mounted on the test plate 31. The shaker 20 reciprocates the test plate 31, in correspondence with the frequency of the first signal from the shaker control unit 10, thereby generating a shaking signal.

Air Bag Control Unit 30

Figure 3:
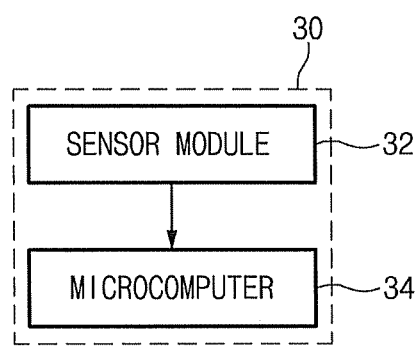
FIG. 3 is a block diagram illustrating a configuration of an air bag control unit according to an embodiment of the present invention.

FIG. 3 is a block diagram illustrating an example of the configuration of the air bag control unit 30. The air bag control unit 30 includes a sensor module 32 and a microcomputer 34. The sensor module 32 is preferably configured by an impact deformation sensor and senses a shaking signal corresponding to the frequency of the first signal generated by the shaker 20. Further, the sensor module 32 converts the sensed shaking signal back to the first signal, and transfers the first signal to the microcomputer 34.

The microcomputer 34 receives the first signal from the sensor module 32 and a second signal time-synchronized with the first signal from the signal control unit 60 to be described below. Further, the microcomputer 34 sums the first signal and the second signal to generate a sum-sensing signal. Here, since the second signal is time-synchronized with the first signal, the microcomputer 34 may easily sum the first signal of a low frequency band and the second signal of a high frequency band. That is, a low frequency band of 1 kHz or lower and a high frequency band of greater than 1 khz and not greater than 20 kHz co-exist in the sum-sensing signal.

The microcomputer 34 compares the sum-sensing signal with a pre-set air bag operation reference value to output a determining signal for determining whether the air bag operates. For example, using the sum-sensing signal, the microcomputer 34 converts a frequency signal per a predetermined time into an energy amount (impact amount). When the converted energy amount is equal to or greater than the pre-set air bag operation reference value, the microcomputer 34 outputs an analog signal for determining whether the air bag operates and transfers the analog determining signal to the load box 40. Conversely, when the converted energy amount is less than the pre-set air bag operation reference value, the microcomputer 34 preferably outputs no signals.

Load Box 40

The load box 40 is a virtually sampled airbag environment of a vehicle. The load box 40 converts the analog determining signal into a digital signal (e.g., digital air bag current) for determining whether the air bag operates. In case of a typical vehicle, a load box receives the analog determining signal from a general air bag control unit, and it operates the air bag. Here, the load box 40 performs a role as a typical vehicle. Namely, the load box 40 does not operate the air bag like the typical vehicle but converts the analog determining signal into the digital determining signal and transfers the digital determining signal to the signal control unit 60. Accordingly, the signal control unit 60 may receive the digital determining signal and analyze a generation time of the digital determining signal.

Signal Generation Unit 50

The signal generation unit 50 generates a second signal of a frequency band of greater than 1 kHz and not greater than 20 kHz, which samples an impact state of a vehicle, and transfers the second signal to the signal control unit 60.

Signal Control Unit 60

Figure 4:
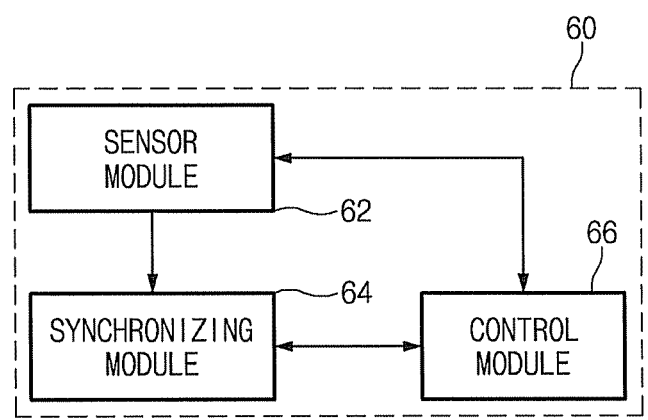
FIG. 4 is a block diagram illustrating a configuration of a signal control apparatus according to an embodiment of the present invention.

FIG. 4 is a block diagram illustrating an example of the configuration of the signal control unit 60.

The signal control unit 60 includes a communication module 62, a synchronizing module 64, and a control module 66.

The communication module 62 receives the second signal from the signal generation unit 50, and receives time synchronizing information regarding the first signal, which is to be used to operate the shaker, from the shaker control unit 10.

Figure 5:
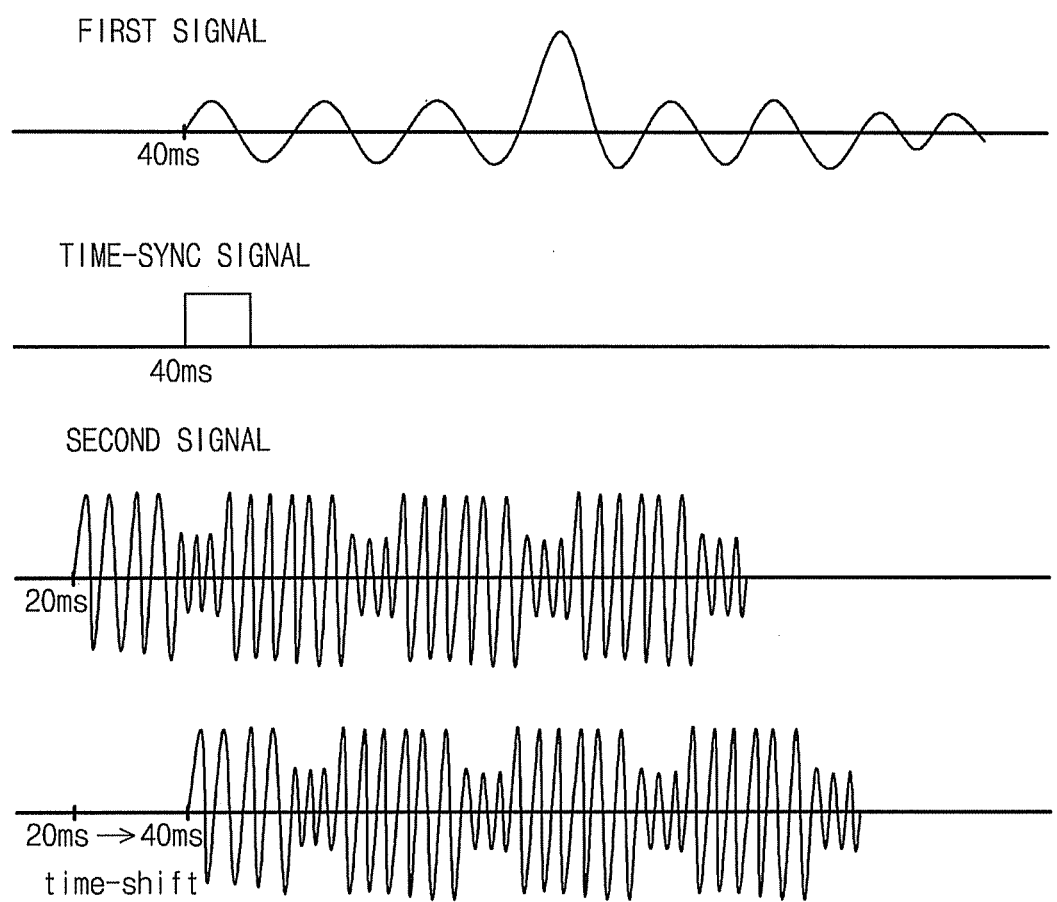
FIG. 5 is a view illustrating time synchronization of a first signal with a second signal by a signal control apparatus according to an embodiment of the present invention.

FIG. 5 is a view illustrating a procedure of time-synchronizing the second signal with the first signal using time synchronizing information regarding the first signal by the signal control unit 60.

The synchronizing module 64 synchronizes a frequency start time of the second signal with a frequency start time of the first signal. Namely, the time synchronizing information contains start time information (e.g., 40 ms point) with respect to a frequency of the first signal. Accordingly, the synchronizing module 64 may synchronize (with respect to time axis) a start time with respect to a frequency of the second signal with a start time with respect to a frequency of the first signal by using, e.g., a time-shift method. Namely, a real start time with respect to a frequency of the second signal is 20 ms, the frequency of the second signal is time-shifted by 20 ms such that the start time of a frequency of the second signal becomes 40 ms. Accordingly, start times with respect to frequencies of the first signal and the second signal become 40 ms.

The control module 66 transfers the second signal time-synchronized with the first signal to the air bag control unit 30 using the communication module 62. Further, the control module 66 transfers the digital determining signal provided from the load box 40 to the testing unit 70 through the communication module 62. In addition, the control module 66 transfers the second signal time-synchronized with the first signal to the testing unit 70.

Testing Unit 70

The testing unit 70 is operatively associated with the shaker control unit 10 to acquire the first signal, and is operatively associated with the signal generation unit 50 to acquire the second signal time-synchronized with the first signal. The first signal and the second signal become a reference for identifying a generation time with respect to the digital determining signal. Namely, the testing unit 70 may know start times with respect to frequencies of the first signal and the second signal, and substitute a generation time (identified through transferred time) of a determining signal using the start times as a reference time to identify characteristics of frequency signals of the first signal and the second signal before generation time of the determining signal.

For example, in case where the energy amount at a point of 60 ms and a point of 80 ms exceeds the pre-set air bag operation reference value, the air bag control unit 30 outputs the determining signal at a point of 90 ms. In this case, the testing unit 70 may determine a response time (generation time of determining signal) as 10 ms.

Meanwhile, the testing unit 70 may determine whether the air bag control unit 30 generates a determining signal, namely, may evaluate a response characteristic according to a frequency in any real frequency of the first signal and the second signal using the relation between frequency characteristics of the first signal and the second signal actually provided through the shaker control unit 10 and the signal generation unit 50 and generation of the determining signal.

Figure 6:
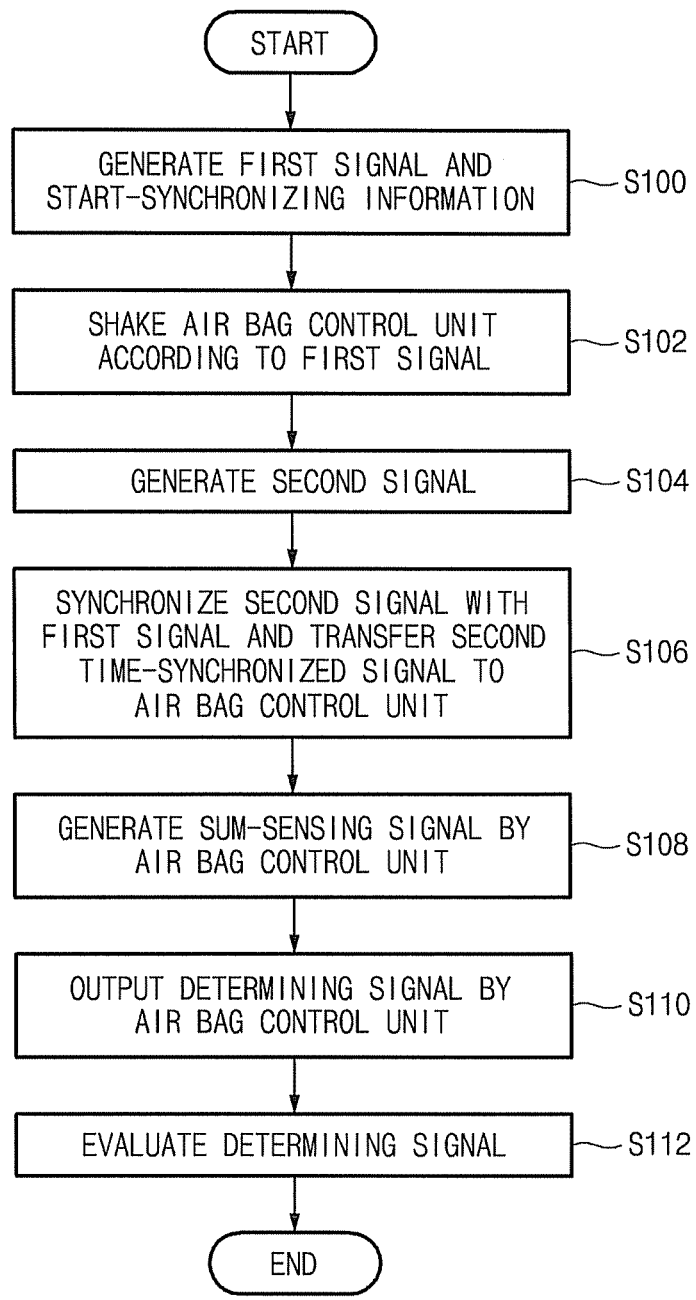
FIG. 6 is a flowchart illustrating a method for testing an air bag control unit of a vehicle according to an embodiment of the present invention.

Hereinafter, a method for testing the air bag control unit 30 according to an embodiment of the present invention is described with reference to FIG. 6.

First, the shaker control unit 10 generates a first signal, which samples an impact state of a vehicle, of a frequency of 1 kHz or lower and transfers the generated first signal to a shaker 20, and generates start-synchronizing information with respect to the first signal and transfers the generated start-synchronizing information to the signal control unit 60 (S100).

Next, the shaker 20 shakes the air bag control unit 30 according to the frequency of the first signal from the shaker control unit 10 (S102).

Subsequently, the signal generation unit 50 generates a second signal, which samples an impact state of a vehicle, of a frequency of greater than 1 kHz and not greater than 20 kHz, and transfers the generated second signal to the signal control unit 60 (S104).

Next, the signal control unit 60 time-synchronizes the second signal with the first signal using the start-synchronizing information, and transfers the second time-synchronized signal to the air bag control unit 30 (S106).

Next, the air bag control unit 30 receives the second signal from the signal control unit 60, senses a shaking signal generated in the shaker 20, converts the shaking signal into a first signal, sums the first signal and the second signal to generate a sum-sensing signal (S108).

Subsequently, the air bag control unit 30 compares the sum-sensing signal with a pre-set air bag operation reference value, outputs an analog determining signal, and transfers the output the analog determining signal to the load box 40 (S110).

Next, when the load box 40 converts the analog determining signal into a digital determining signal, and transfers the digital determining signal to the testing unit 70 through the signal control unit 60. The testing unit 70, operatively associated with the shaker control unit 10 and the signal generation unit 50, acquires the first signal and the second signal, analyzes a generation time of the digital determining signal according to frequency characteristics of the acquired first signal and the second signal to evaluate response characteristics (e.g., a response time of the air bag control unit 30 according to a frequency). (S112).

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A system for testing an air bag control unit of a vehicle, the system comprising:
   a shaker control unit generating a first signal and start-synchronizing information corresponding to the first signal;
   a shaker shaking an air bag control unit according to the frequency of the first signal;
   a signal control unit time-synchronizing a second signal with the first signal using the start-synchronizing information and transferring the second signal to the air bag control unit; and
   an air bag control unit generating a sum-sensing signal from the first signal and the second signal, generating from the sum-sensing signal a determining signal of whether an air bag operates and transferring the generated determining signal to the signal control unit.

2. The system of claim 1, further comprising a testing unit testing operation characteristics of the air bag control unit using the first signal, the second signal, and the determining signal.

3. The system of claim 1, wherein the start-synchronizing information contains start time information of the first signal.

4. A signal control apparatus testing an air bag control unit of a vehicle, the apparatus comprising:
   a shaker control unit sensing a first signal that is used to operate a shaker;
   a communication module receiving from the shaker control unit start-synchronizing information regarding the first signal;
   a synchronizing module time-synchronizing a second signal with the first signal using the start-synchronizing information; and
   a control module transferring the second signal to the air bag control unit such that the air bag control unit outputs a determining signal of whether an air bag operates through a sum-sensing signal obtained from the first signal and the second signal.

5. The signal control apparatus of claim 4, wherein the control module receives the determining signal from the air bag control unit and transfers to a testing unit such that the testing unit evaluates operation characteristics of the air bag control unit by using the determining signal, the first signal, and the second signal.

6. The signal control apparatus of claim 4, wherein the start-synchronizing information contains start time information of the first signal.

7. The signal control apparatus of claim 4, wherein the first signal has a frequency band of 1 kHz or lower, and the second signal has a frequency band of greater than 1 kHz and not greater than 20 kHz.

8. A air bag control unit for a vehicle, comprising:
   a sensor module sensing a shaking signal corresponding to a frequency of a first signal generated by a shaker; and
   a microcomputer receiving a second signal time-synchronized with the first signal, generating a sum-sensing signal using the first signal and the second signal, comparing the sum-sensing signal with a pre-set air bag operation reference value, and outputting a determining signal of whether an air bag operates.

9. The air bag control unit of claim 8, wherein the microcomputer transfers the determining signal to a testing unit through a signal control unit such that the testing unit evaluates operation characteristics of an air bag control unit using the first signal, the second signal, and the determining signal.

10. The air bag control unit of claim 9, wherein the start-synchronizing information contains start time information of the first signal.

11. The air bag control unit of claim 9, wherein the first signal has a frequency band of 1 kHz or lower, and the second signal has a frequency band of greater than 1 kHz and not greater than 20 kHz.

12. A method for testing an air bag control unit of a vehicle, the method comprising:
   (a) generating a first signal and start-synchronizing information corresponding to the first signal by a shaker control unit;
   (b) shaking an air bag control unit according to a frequency of the first signal by a shaker;
   (c) time-synchronizing a second signal with the first signal using the start-synchronizing information and transferring the second signal to the air bag control unit by a signal control unit; and
   (d) generating a sum-sensing signal from the first signal and the second signal, generating from the sum-sensing signal a determining signal of whether an air bag operates, and transferring the determining signal to the signal control unit by the air bag control unit.

13. The method of claim 12, further comprising testing operation characteristics of the air bag control unit using the first signal, the second signal, and the determining signal by a testing unit.

14. A method for generating signal for testing an air bag control unit of a vehicle, the method comprising:

(a) generating a first signal and start-synchronizing information corresponding to the first signal by a shaker control unit;
(b) time-synchronizing the second signal with the first signal using the start-synchronizing information; and
(c) transferring the second signal to an air bag control unit that the air bag control unit outputs a determining signal of whether an air bag operates from a sum-sensing signal obtained from the first signal and the second signal.

15. The method of claim 14, further comprising (c) receiving the determining signal from the air bag control unit and transferring to a testing unit such that the testing unit evaluates operation characteristics of the air bag control unit from the determining signal, the first signal, and the second signal.

16. A method for processing a signal for testing an air bag control unit of a vehicle, the method comprising:
(a) sensing a shaking signal corresponding to a frequency of a first signal generated by a shaker;
(b) receiving a second signal time-synchronized with the first signal;
(c) generating a sum-sensing signal from the first signal and the second signal; and
(d) comparing the sum-sensing signal with a pre-set air bag operation reference value, and outputting a determining signal of whether an air bag operates.

17. The signal processing method of claim 16, further comprising:
(e) transferring the determining signal to a testing unit through a signal control unit such that the testing unit evaluates operation characteristics of an air bag control unit from the first signal, the second signal, and the determining signal.

\* \* \* \* \*